United States Patent
Hauser et al.

(10) Patent No.: US 10,928,220 B2
(45) Date of Patent: Feb. 23, 2021

(54) METER READER AND METER READING SYSTEM

(71) Applicant: Stark Software International Ltd., Horley (GB)

(72) Inventors: Angela Hauser, Horley (GB); Andrew Hull, Horley (GB); Trevor Tancock, Horley (GB); Howard Stark, Horley (GB)

(73) Assignee: Stark Software International Ltd., Surrey (GB)

(*) Notice: Subject to any disclaimer, the term of this patent is extended or adjusted under 35 U.S.C. 154(b) by 0 days.

(21) Appl. No.: 16/071,935

(22) PCT Filed: Dec. 14, 2016

(86) PCT No.: PCT/EP2016/081070
§ 371 (c)(1),
(2) Date: Jul. 23, 2018

(87) PCT Pub. No.: WO2017/102885
PCT Pub. Date: Jun. 22, 2017

(65) Prior Publication Data
US 2019/0072411 A1 Mar. 7, 2019

(30) Foreign Application Priority Data
Dec. 18, 2015 (GB) .................................. 1522438

(51) Int. Cl.
*G01D 4/00* (2006.01)
*H04L 29/08* (2006.01)

(52) U.S. Cl.
CPC ............ *G01D 4/004* (2013.01); *H04L 67/06* (2013.01); *H04L 67/12* (2013.01); *Y02B 90/20* (2013.01); *Y04S 20/30* (2013.01)

(58) Field of Classification Search
CPC .......... G01D 4/00; G01D 4/002; G01D 4/004; G01D 4/006; H04L 67/06; H04L 67/12;
(Continued)

(56) References Cited

U.S. PATENT DOCUMENTS 6,801,865 B2 * 10/2004 Gilgenbach ............ H04B 3/546
702/61
8,587,452 B2 * 11/2013 Wynans ................. G01D 4/004
340/870.03
(Continued)

FOREIGN PATENT DOCUMENTS

AU 2011203513 7/2011
CN 202260625 5/2012
(Continued)

OTHER PUBLICATIONS

International Search Report for corresponding Patent Application No. PCT/EP2016/081070 dated Mar. 23, 2017.

*Primary Examiner* — Franklin D Balseca
(74) *Attorney, Agent, or Firm* — Renner, Otto, Boisselle & Sklar, LLP

(57) ABSTRACT

A meter reading system, comprising: a monitoring station which monitors a plurality of meters, wherein the meters each include a storage unit which stores data as to usage and/or generation at predetermined intervals and an interface for communication with a meter reader; and a plurality of meter readers which communicate with the monitoring station, and, under control of the monitoring station, each designate the meters to be read and return data read from the meters to the monitoring station; wherein the monitoring station comprises a storage unit which stores data for each of the meters being monitored, and a communications unit which maintains entries for each of the meters for communication to and from the meter readers, the entries each designating the required data to be read from the respective (Continued)

meters; wherein the meter readers each comprise a storage unit which receives the entries for the meters to be monitored thereby, and, on reading the meters, stores the required data, an interface which is connectable to the interfaces of the respective meters and allows for communication with the respective meters, and a communications unit which provides for communication to and from the monitoring station.

12 Claims, 4 Drawing Sheets

(58) Field of Classification Search
CPC .. Y02B 90/241; Y02B 90/242; Y02B 90/243; Y02B 90/20; Y04S 20/30; Y04S 20/32; Y04S 20/322; Y04S 20/325; Y04S 20/36; H04Q 2209/00; H04Q 2209/10; H04Q 2209/20; H04Q 2209/40; H04Q 2209/43; H04Q 2209/50; H04Q 2209/60; H04Q 9/00
See application file for complete search history.

(56) References Cited

U.S. PATENT DOCUMENTS

| | | | |
|---|---|---|---|
| 9,400,192 B1* | 7/2016 | Salser, Jr. | G01D 4/002 |
| 9,526,078 B1* | 12/2016 | Sevindik | H04W 56/001 |
| 9,571,181 B2* | 2/2017 | Zulch, III | H04B 7/18506 |
| 9,628,562 B2* | 4/2017 | Davis | H04L 67/1095 |
| 9,674,589 B2* | 6/2017 | Osterloh | H04Q 9/00 |
| 2003/0004660 A1 | 1/2003 | Hunter | |
| 2006/0074601 A1* | 4/2006 | Hoiness | G01D 4/006 702/188 |
| 2008/0272933 A1* | 11/2008 | Cahill-O'Brien | G01D 4/006 340/870.02 |
| 2010/0188256 A1* | 7/2010 | Cornwall | G01D 4/004 340/870.02 |
| 2011/0004764 A1* | 1/2011 | Stuber | G01D 4/004 713/176 |

FOREIGN PATENT DOCUMENTS

| | | |
|---|---|---|
| CN | 203659191 | 6/2014 |
| CN | 104062916 | 9/2014 |
| WO | 1999/065169 | 12/1999 |

* cited by examiner

| Meter ID | Customer | Post Code | Address |
|---|---|---|---|
| •391 | Essilor Limited | BS35 3UW | Unit 21 Cooper Road, Unit 21, Cooper Road, Thornbury, Bristol |
| •391 | TRAVIS PERKINS PLC | BS37 7PR | TRAVIS PERKINS TRADING CO LTD, 70 NORTH ROAD, YATE, BRISTOL, AVON |
| •E14 | Rontec Watford Limited | BS37 4PS | YATEBRIDGE SERVICE STATION, 10 STATION ROAD, YATE, BRISTOL |
| •E06 | Enterprise Inns PLC | BS37 4NG | ABBOTSWOOD INN, ABBOTSWOOD, YATE, BRISTOL, AVON |
| •E13 | Renishaw Ltd | BS35 3UU | ASHVILLE PARK, UNIT D 4, SHORT WAY, THORNBURY, BRISTOL, AVON |
| •389 | TRAVIS PERKINS PLC | BS35 3UR | UNIT 1, BRUNEL WAY, THORNBURY WAY, BRISTOL |
| •391 | TRAVIS PERKINS PLC | CF31 3YY | TRAVIS PERKINS LTD, BRANCH 1385-3, WATERTON INDUSTRIAL ESTATE, WATERTON, BRIDGEND, MID GL |
| •391 | TRAVIS PERKINS PLC | CF48 4DR | SYSTEM ELECTRICAL ENGINEERING LTD, SYSTEMS HOUSE, MERTHYR TYDFIL INDUSTRIAL PARK, PENT |
| •391 | Ladbrokes Betting & Gaming Ltd | CF37 4TR | GROUND FLOOR PRINCIPALITY HOUSE, 31 TAFF STREET, PONTYPRIDD, MID GLAMORGAN |
| •391 | TRAVIS PERKINS PLC | CF37 2PP | UNIT 2, GYFEILLION ROAD, HOPKINSTOWN, PONTYPRIDD |
| •E15 | TAFF Housing Association | CF10 5HE | Landlord Supply 2, Landlords Supply 2, Red Sea House, Mana Street, Cardiff |
| •391 | SOUTH WALES POLICE | CF31 3YU | SOUTH WALES POLICE, TRAINING FACILITY, FIRING RANGE, WATERTON, BRIDGEND |
| •384 | SOUTH WALES POLICE | CF64 1JF | SOUTH WALES POLICE, POLICE STATION, 97 WINDSOR ROAD, PENARTH, SOUTH GLAMORGAN |
| •391 | TRAVIS PERKINS PLC | CF14 4HD | BRITTONS BUILDING SUPPLIES, JUNC OF FIELDWAY & MAESCOED ROAD, HEATH, CARDIFF |
| •E14 | Mkm Estates Ltd C | CF15 7LY | UNTI 2, BLOCK 4, MERTHYR ROAD, CORYTON, CARDIFF |
| •384 | Ladbrokes Betting & Gaming Ltd | CF14 3JP | SHOP 1464, 51 WHITCHURCH ROAD, CARDIFF |
| •391 | SOUTH WALES POLICE | CF44 7EG | SOUTH WALES POLICE, POLICE STATION, CROSS STREET, ABERDARE, MID GLAMORGAN |
| •391 | SOUTH WALES POLICE | CF39 9RT | SOUTH WALES CONSTABULARY, POLICE STATION, PORTH STREET, PORTH, MID GLAMORGAN |
| •384 | Ladbrokes Betting & Gaming Ltd | CF31 5EJ | UNIT 13, DISTRICT CENTRE BROADLANDS, GENTLE WAY, BRIDGEND, MID GLAMORGAN |
| •391 | SOUTH WALES POLICE | CF31 3SU | PORTACABINS, TACTICAL FIREARMS UNIT, POLICE HEADQUARTERS, ST JAMES RISE, BRIDGEND |
| •391 | SOUTH WALES POLICE | CF15 8LX | UNIT 3, FAIRFIELD BUSINESS PARK, GWAELOD-Y-GARTH, CARDIFF |
| •E11 | Iron Mountain (UK) Ltd* | CF14 4HH | IRON MOUNTAIN, MAES-Y-COED ROAD, CARDIFF, SOUTH GLAMORGAN |

FIG. 3

METER READER AND METER READING SYSTEM

This application is a national phase of International Application No. PCT/EP2016/081070 filed Dec. 14, 2016 and published in the English language, which claims priority to EP Patent Application No. 1522438.9 filed Dec. 18, 2015, which are hereby incorporated herein by reference.

The present invention relates to a meter reader for collecting data from meters, such as gas or electricity meters, and a meter reading system.

Meters, such as gas or electricity meters, can require reading, for example, when communication is lost with a central monitoring station, or the meters are not able to be connected to the central monitoring station, such as when at a remote location with no means of communication.

In one aspect the present invention provides a meter reading system, comprising: a monitoring station which monitors a plurality of meters, wherein the meters each include a storage unit which stores data as to usage and/or generation at predetermined intervals and an interface for communication with a meter reader; and a plurality of meter readers which communicate with the monitoring station, and, under control of the monitoring station, each designate the meters to be read and return data read from the meters to the monitoring station; wherein the monitoring station comprises a storage unit which stores data for each of the meters being monitored, and a communications unit which maintains entries for each of the meters for communication to and from the meter readers, the entries each designating the required data to be read from the respective meters; wherein the meter readers each comprise a storage unit which receives the entries for the meters to be monitored thereby, and, on reading the meters, stores the required data, an interface which is connectable to the interfaces of the respective meters and allows for communication with the respective meters, and a communications unit which provides for communication to and from the monitoring station.

In another aspect the present invention provides a meter reader which communicates with a monitoring station, and, under control of the monitoring station, reads and returns data to the monitoring station from meters which are designated by the monitoring station, the meter reader comprising: a storage unit which receives entries for the meters to be monitored thereby, and, on reading the meters, stores the required data; an interface which is connectable to interfaces of the respective meters and allows for communication with the respective meters; and a communications unit which provides for communication to and from the monitoring station.

Preferred embodiments of the present invention will now be described hereinbelow by way of example only with reference to the accompanying drawings, in which:

FIG. 3 illustrates an exemplary read schedule as generated by the meter reading system of FIG. 1 for one meter reader.

Figure 1:
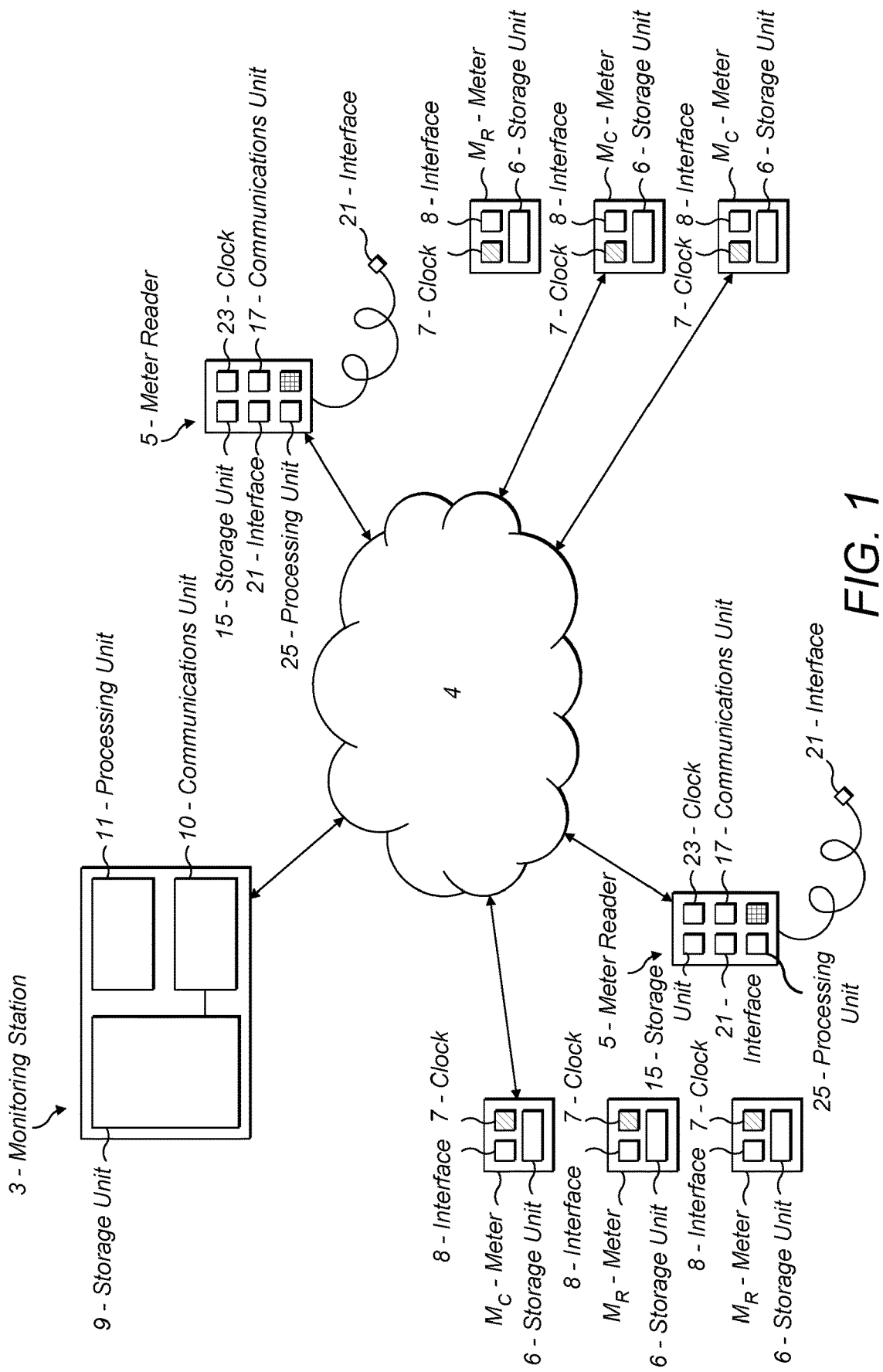
FIG. 1 illustrates a meter reading system in accordance with one embodiment of the present invention.

The meter reading system comprises a central monitoring station 3 which monitors a plurality of meters M, and a plurality of meter readers 5 which are in communication 4 with the monitoring station 3, either by wired or wireless communication, for example, over the internet or mobile data communication, and, under control of the monitoring station 3, identify the meters M to be read and return data read from the meters M to the monitoring station 3.

The meters M comprise a first plurality of meters $M_c$ which are in direct communication with the monitoring station 3 and a second plurality of meters $M_R$ which are remote and not directly connected to the monitoring station 3.

The meters M each include a storage unit 6 which maintains data as to power usage and/or generation at defined time intervals, a clock 7 which maintains a time, and an interface 8 which allows for communication with and the reading of the data from the respective meter M, as will be described in more detail hereinbelow.

In this embodiment the storage unit 6 of the meter M stores the data in encrypted form.

In this embodiment the interface 8 is an optical interface. In another embodiment the interface 8 could be a wireless interface, such as Bluetooth® or NFC.

The monitoring station 3 comprises a storage unit 9, in this embodiment a database, which stores data for each of the meters M being monitored, a communications unit 10, in this embodiment an FTP server, which maintains entries for each of the meters M for communication to and from the meter readers 5, which designate the required data, and a processing unit 11 which controls the operation of the monitoring station 3.

The meter readers 5 each comprise a storage unit 15, in this embodiment memory, which receives, in this embodiment by downloading, an entry for each of the meters M to be monitored, which designates the required data, and, on reading, maintains the data, a communications unit 17 which provides for communication to and from the monitoring station 3, an interface 21 which allows for communication with and the reading of data from the respective meters M, a clock 23 which maintains a time, and a processing unit 25 which controls the operation of the meter reader 5.

In this embodiment the storage unit 15 stores the data in encrypted form.

In this embodiment the communications unit 17 provides communication via one or both of an internet connection protocol or a mobile communications protocol.

In this embodiment the interface 21 is an optical interface. In another embodiment the interface 21 could be a wireless interface, such as Bluetooth® or NFC.

Figure 2:
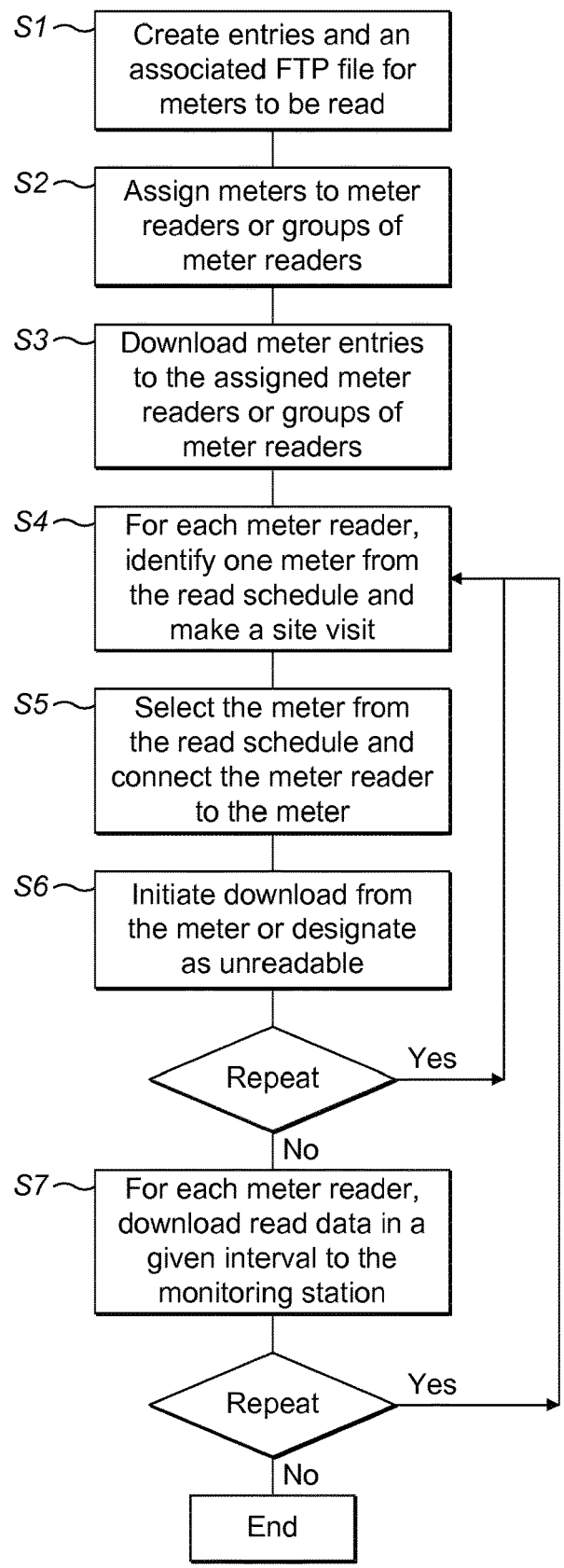
FIG. 2 represents the operations in reading data from meters using the meter reading system of FIG. 1.

Operation of the meter reading system will now be described with reference to FIG. 2.

Entries and an associated FTP file are first created (Step S1) for a plurality of meters M which are to be read.

As discussed above, the entries in the FTP file designate the required data from the respective meters M, which represents a limited set of the data as stored by the meters M. The meters M record data at frequent intervals, and, by requiring that a limited set of data be read from the meters M, the reading of the meters M can be done much more quickly, and, furthermore, storage of data is significantly reduced.

The meters M are assigned (Step S2) to predetermined meter readers 5 or groups of meter readers 5, such as belonging to separate meter reading companies. In this way, meters M can be assigned to meter readers 5 by way of location.

The entries are then downloaded (Step S3), either push or pull, to the assigned meters M or groups of meters M.

Once downloaded, the meter readers 5 each include a read schedule of meters M which are to be read by the respective meter readers 5. FIG. 3 illustrates an exemplary read schedule of meters M to be read.

The user then identifies (Step S4) one of the meters M to be read and visits the site of that meter M.

Figure 4:
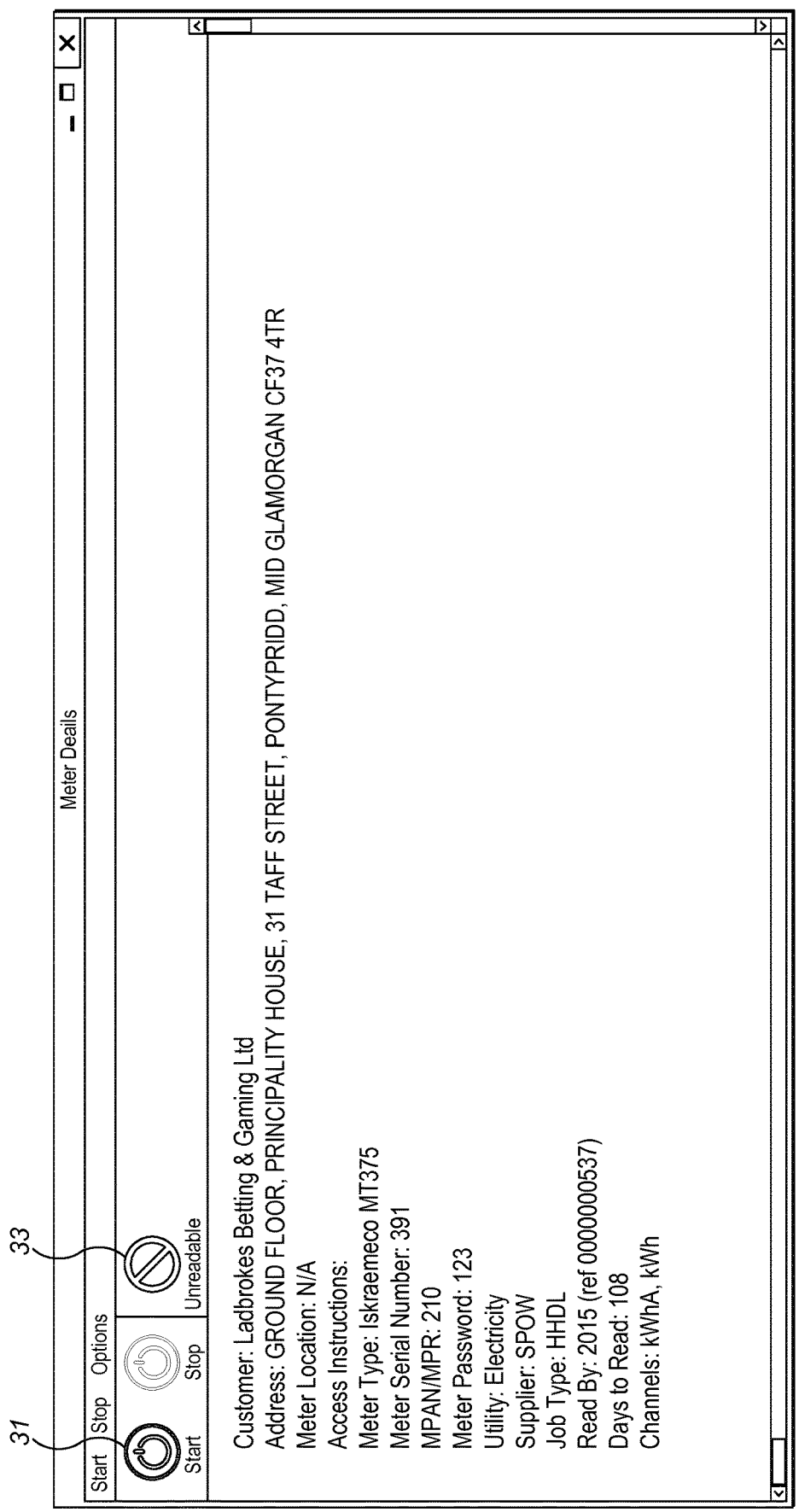
FIG. 4 illustrates an exemplary entry for one meter selected from the read schedule of FIG. 3.

The user then (Step S5) selects the meter M from the read schedule, and connects the interface 21 of the meter reader 5 to the interface 8 of the meter M. As illustrated in FIG. 4, each meter M has an associated entry.

Then (Step S6), the user initiates download of data from the meter M to the meter reader 5, in this embodiment by operating or clicking the "Start" button 31. If the meter M is not available, the user operates or clicks the "Unreadable" button 33.

In this embodiment the meter reader 5 first performs a check through the connected interface 21 to identify the meter M as the meter M selected from the read schedule, here by checking the serial number or ID of the meter M.

If the meter ID in the read schedule of the meter reader 5 matches the meter ID which is read from the meter M, then the meter reader 5 logs into the meter M, in this embodiment using a password which is in the read schedule of the meter reader 5.

In this embodiment the meter reader 5 then reads the clock 7 of the meter 5.

If the difference in time between the clock 7 of the meter M and the clock 23 of the meter reader 5 is within a first predetermined time period, here between 0 s and 20 s, then the meter reader 5 begins downloading the required data from the meter M, as described in more detail hereinbelow.

If the difference in time between the clock 7 of the meter M and the clock 23 of the meter reader 5 is within a second predetermined time period, which is greater than the first predetermined time period, here between 20 s and 900 s, then the meter reader 5 resets the clock 7 of the meter M and subsequently begins downloading the required data from the meter M, as described in more detail hereinbelow.

If the difference in time between the clock 7 of the meter M and the clock 23 of the meter reader 5 is within a third predetermined time period, which is greater than the second predetermined time period, here greater than 900 s, then the meter reader 5 aborts the communication with the meter M.

As discussed above, the entry associated with the meter M is pre-assigned with parameters as to the data to be downloaded, thus requiring no intervention by the user. And, by virtue of downloading only a limited amount of the data stored at the meter M, the downloading can be done more quickly, allowing the user to user to read more meters M in any given period.

Then, in a given period, for example, daily, Steps S4 to S6 are repeated for a plurality of meters M at different sites.

Next, at given intervals, for example, once daily, or when prompted, for each meter reader 5, the data which has been read is downloaded to the monitoring station 3 (Step S7).

Then, Steps S4 to S7 are repeated for further ones of the plurality of meters M at different sites, until all of the meters M in the read schedule have been read.

Finally, it will be understood that the present invention has been described in its preferred embodiments and can be modified in many different ways without departing from the scope of the invention as defined by the appended claims.

The invention claimed is:

1. A meter reading system, comprising:
   a monitoring station which monitors a plurality of meters; and
   a plurality of meter readers which communicate with the monitoring station, and under control of the monitoring station, each of the plurality of meter readers is designated with one or more of the plurality of meters to be read, and each of the plurality of meter readers returns data read from its respective designated one or more meters to the monitoring station, wherein the plurality of meter readers each downloads a separate entry for each meter of its respective designated one or more meters from the monitoring station, and the monitoring station designates required data to be collected from each of the one or more meters to be read designated to each of the plurality of meter readers;
   wherein the monitoring station comprises a storage unit which stores data for each of the plurality of meters being monitored, and a communications unit which maintains the entries for each of the one or more meters designated to each of the plurality of meter readers for communication to and from the plurality of meter readers;
   wherein each of the one or more meters designated to each of the plurality of meter readers includes a storage unit which stores data as to usage and/or generation at predetermined intervals, and an interface for communication;
   wherein the plurality of meter readers each comprises: (i) a storage unit which receives the entries for each meter of its respective designated one or more meters, and which stores the required data designated by the monitoring station when the meter reader reads its respective designated one or more meters, (ii) an interface which is connectable to the interfaces of its respective designated one or more meters and allows for communication with its respective designated one or more meters, (iii) a communications unit which provides for communication to and from the monitoring station;
   wherein the plurality of meter readers each includes a read schedule of its respective designated one or more meters which are to be read by the respective plurality of meter readers;
   wherein each of the one or more meters designated to each of the plurality of meter readers includes a clock which maintains a time, and the plurality of meter readers each includes a clock which maintains a time, and
   when at least one meter reader of the plurality of meter readers initiates a download from at least one meter of its respective designated one or more meters in its read schedule, the at least one meter reader reads the clock of the at least one meter, and
   (1) when a difference in time between the clock of the at least one meter and the clock of the at least one meter reader is within a first predetermined time period, then the at least one meter reader begins downloading the required data designated by the monitoring station from the at least one meter,
   (2) when a difference in time between the clock of the at least one meter and the clock of the at least one meter reader is within a second predetermined time period, which is greater than the first predetermined time period, then the at least one meter reader resets the clock of the at least one meter and subsequently begins downloading the required data designated by the monitoring station from the at least one meter, and
   (3) when the difference in time between the clock of the at least one meter and the clock of the at least one meter reader is within a third predetermined time period, which is greater than the second predetermined time period, then the at least one meter reader aborts the communication with the at least one meter.

2. The system of claim 1, wherein the plurality of meter readers are in communication with the monitoring station by wired or wireless communication.

3. The system of claim 1, wherein the plurality of meters comprise a first plurality of meters which are in direct communication with the monitoring station and a second plurality of meters which are remote and not directly connected to the monitoring station.

4. The system of claim 1, wherein the interfaces of the plurality of meter readers and of their designated one or more meters are optical interfaces, wireless interfaces, Bluetooth® interfaces or NFC interfaces.

5. The system of claim 1, wherein (i) the communications unit of the monitoring station comprises an FTP server, and/or (ii) the communications unit of the monitoring station provides communication via one or both of an internet connection protocol or a mobile communications protocol.

6. The system of claim 1, wherein the required data designated by the monitoring station represents a limited set of data as stored by each of the one or more meters to be read designated to each of the plurality of meter readers.

7. The system of claim 1, wherein the one or more of the plurality of meters to be read designated to each of the plurality of meter readers include a plurality of meters that are assigned to predetermined ones of the plurality of meter readers or groups of ones of the plurality of meter readers.

8. The system of claim 1, wherein, in initiating the download from the at least one meter, the at least one meter reader performs a check to identify that the at least one meter is selected from the read schedule.

9. The system of claim 8, wherein the check is of an ID of the at least one meter, and, if the ID of the at least one meter in the read schedule of the at least one meter reader matches the ID which is read from the at least one meter, then the at least one meter reader logs into the at least one meter.

10. The method of claim 1, wherein the first predetermined time period is between 0 s and 20 s.

11. The method of claim 1, wherein the second predetermined time period is between 20 s and 900 s.

12. The method of claim 1, wherein the third predetermined time period is greater than 900 s.

* * * * *